US006808057B1

(12) United States Patent
Nirmal et al.

(10) Patent No.: US 6,808,057 B1
(45) Date of Patent: Oct. 26, 2004

(54) TRUCK-MOUNTED ESCALATOR

(76) Inventors: Jitendra R. Nirmal, 1225 Woodbury La., #3A, Palatine, IL (US) 60074; Ravi J. Nirmal, 1225 Woodbury La., #3A, Palatine, IL (US) 60074

( * ) Notice: Subject to any disclaimer, the term of this patent is extended or adjusted under 35 U.S.C. 154(b) by 0 days.

(21) Appl. No.: 10/787,454

(22) Filed: Feb. 26, 2004

(51) Int. Cl.[7] .............................................. B65G 25/10
(52) U.S. Cl. .................... 198/312; 198/300; 198/316.1; 198/321
(58) Field of Search ................................ 198/300, 309, 198/312, 313, 315, 316.1, 321

(56) References Cited

U.S. PATENT DOCUMENTS

| | | | |
|---|---|---|---|
| 1,433,884 A | * 10/1922 | Frost | ........................... 198/311 |
| 2,929,482 A | 3/1960 | Coryell | |
| 2,967,602 A | 1/1961 | Mosier | |
| 3,033,340 A | 5/1962 | Croyell | |
| 3,543,917 A | 12/1970 | Duersken | |
| 3,724,015 A | * 4/1973 | Japes | ........................... 104/71 |
| 4,574,937 A | 3/1986 | Anderson et al. | |
| 4,669,574 A | * 6/1987 | Moutot | ........................ 182/88 |
| 4,733,767 A | * 3/1988 | Anderson et al. | ........... 198/304 |
| 4,759,437 A | 7/1988 | Bevins | |
| 5,950,267 A | * 9/1999 | Ricci, Jr. | ...................... 14/71.1 |
| 6,755,296 B2 | * 6/2004 | Elwell | ........................ 198/304 |

* cited by examiner

Primary Examiner—Douglas Hess

(57) ABSTRACT

The truck-mounted escalator is an improvement to mobile passenger stairways used to allow airline passengers to board and alight from large commercial aircraft. The improvement consists of motorizing the steps so they would function identically to escalator staircases commonly used in building structures. The truck-mounted escalator would consist of an electrical motor-driven escalator unit mounted on the bed of a dump truck style vehicle. The vehicle would feature a central support for the escalator unit and a hydraulic unit by which the escalator could be inclined for desired positioning. The escalator unit and hydraulic lift could be controlled by either of two control units, one located in the cab and the other on the rear of the truck bed. Electrical power for the motor, escalator unit, hydraulic lift, and control units would be supplied by the truck battery.

20 Claims, 3 Drawing Sheets

TRUCK-MOUNTED ESCALATOR

BACKGROUND OF THE INVENTION

1. Field of the Invention

The present invention relates to an escalator, and more particularly to a mobile escalator. The truck-mounted escalator has particular utility in connection with providing a mobile escalator which can easily be moved from place to place and quickly positioned for user access, such as at airplanes that are parked away from the typical loading platform.

2. Description of the Prior Art

Mobile passenger stairways are used in airports to comfortably assist passengers in debarking from the plane when the arrival or departure gate is not elevated above ground level. They are more common in medium size airports with short-hop commuter jet service but are also used to a lesser extent at larger airports when the arrival or departure gate is at the tarmac level. Existing mobile passenger stairways can be configured on a manual dolly base with locking wheels, or they can be mounted upon a motorized truck chassis. However, the existing mobile passenger stairways all share the aspect of having individual steps that are permanently fixed in location. Due to the height of the airplane above the ground, these passenger stairways are typically quite steep. Climbing such a stairway could pose a strenuous and forbidding task for passengers with age or health related infirmities as well as those with physical limitations. Additionally, the steepness of the stairs could lead to passengers slipping and falling due to loss of balance. Therefore, a passenger stairway that functioned identically to escalator stairs would make debarking from planes to the ground a safer, more acceptable procedure for all passengers.

The use of portable escalators is known in the prior art. For example, U.S. Pat. No. 2,929,482 to Floyd Coryell discloses a portable escalator having an upper platform that may be hydraulically raised or lowered and a stationary lower platform. The portable escalator consists of a movable ramp, which might include steps, that is rotated by an electrically driven belt and pulley assembly. The entire escalator assembly is mounted on a movable platform with a pair of front wheels and a pair of rear wheels, at least one of which includes a pulley engaged by a drive belt, which is in turn driven by a pulley carried by the drive shaft of a suitable electric motor. However, the Coryell '482 patent utilizes collapsible supports for the escalator unit which could lead to possible collapse of the entire structure if the supports are not properly positioned with each use. This would require an additional safety check each time the escalator assembly was positioned for use. Furthermore, the complexity of the belts and pulleys of the Coryell '482 device would increase the necessary maintenance for the device as well as increasing the chances of mechanical failure.

U.S. Pat. No. 3,033,340 to Floyd Coryell is a continuation of Coryell '482 and further discloses his portable escalator. This escalator is gear driven and is raised and lowered by an electrically operated elevator in the form of a pair of screwjacks. However, in order to keep the links of the conveyor taut, the floor of the upper end platform of the Coryell '340 device could not be maintained horizontally for some angles of inclination of the escalator. This could disorient passengers, causing them to lose their balance, when stepping off the escalator onto the platform or from the plane onto the platform. Additionally, the Coryell '340 patent relies on pin and slot connections to securely engage when the escalator is raised. This increases the chances of mechanical failure, which could lead to the subsequent collapse of the escalator.

Similarly, U.S. Pat. No. 2,967,602 to Russell B. Mosier discloses a boarding apparatus for aircraft that includes a sprocket driven conveyor with handrails that is mounted on a dolly or similar mechanical device. However, the Mosier '602 patent fails to provide an electrical source to power the device; therefore, the boarding apparatus could be utilized only near an acceptable power source. In addition, changing the inclination of the Mosier '602 device requires the user to operate a hand wheel. This could be an awkward and cumbersome task for individuals with limited arm or hand strength and could take a considerable amount of time in a trial and error process to properly position the boarding apparatus.

U.S. Pat. No. 4,759,437 to John R. Bevins discloses a handrail for an aircraft belt loader in which a pair of parallel support arms pivotally supports a rigid rail member. The handrail is collapsible and relies on a compression spring to fully erect the device when it is operative. However, due to the collapsible nature of the Bevins '437 device, an incomplete or improperly locked support arm could lead to collapse of the device upon application of the weight of a debarking passenger leaning upon the rail for support. In addition, the support arms of the Bevins '437 device are spaced far enough apart to allow a passenger, such as a small child or one who lost his footing, to fall through to the ground below.

Likewise, U.S. Pat. No. 4,574,937 to James M. Anderson and William C. Dean discloses a multi-positionable rail for the conveyor of an aircraft belt loader. The rail would be supported by a plurality of parallel posts pivotably connected to the side wall of the conveyor and rail and collapsible under the force of gravity. However, the Anderson, et al. '937 patent uses posts that are collapsibly and pivotably connected to the conveyor. This would require human intervention to verify the structure prior to each use since incorrect positioning or insufficient locking of these posts could cause injury to an individual placing any weight or stress upon them. Furthermore, the rails of the Anderson, et al. '937 device are spaced far enough apart that a young child or an individual who tripped or lost his footing in some manner could potentially fall through the opening to the ground below.

Lastly, U.S. Pat. No. 3,543,917 to Arnold Duersken discloses an inclined elevator conveyor wherein a series of horizontal platforms, articulated in sections, travel an inclined, reversible cyclic path. The leading end of each platform moves out of the way of the cargo on the platform, while the trailing end of each platform continues to follow the cargo as it is discharged onto a cargo receiving table. The direction of cargo movement is varied by variously directing the table. However, while the Duersken '917 patent provides for the movement of cargo along the conveyor, it does not provide a suitable means for moving people along the same conveyor. The roller arrangement used to propel the conveyor and the buckets used to stow the cargo during transport would not be suitable for use by individuals entering or exiting an aircraft. Additionally, the Duersken '917 device is comprised of collapsible support members, which could collapse if not properly locked into place when the conveyor was placed in an inclined position. Finally, the Duersken '917 patent fails to provide a hand rail which would prevent passengers from falling from the conveyor device.

While the above-described devices fulfill their respective, particular objectives and requirements, the aforementioned patents do not describe a truck-mounted escalator that provides an easy-to-use and portable escalator for allowing airline passengers a safe and physically undemanding means for entering or exiting an aircraft that is parked on the tarmac. The Coryell '482, Coryell '340, Bevins '437, Anderson, et al. '937, and the Duersken '917 devices are all comprised of collapsible components which would require constant supervision to ensure that all parts are correctly positioned to avoid collapse of the structure. Furthermore, the complexity of the belts and pulleys of the Coryell '482 device would increase the necessary maintenance for the device as well as increasing the chances of mechanical failure. The Coryell '340 device could lead to problems with passengers maintaining their balance since, in order to keep the links of the conveyor taut, the floor of the upper end platform of the Coryell '340 device is sometimes tilted. Additionally, the support arms for the rails taught by the Bevins '437 and Anderson, et al. '937 devices are spaced at such a distance that a passenger could fall between them to the ground. The Mosier '602 patent fails to provide an electrical source to power the device; therefore, the boarding apparatus could be utilized only near an acceptable power source. Moreover, the Mosier '602 device requires the use of a hand wheel to raise or lower the device. Lastly, the Duersken '917 patent fails to provide either a suitable means for moving people along the conveyor or a safety hand rail to prevent passengers falling from the conveyor.

Therefore, a need exists for a new and improved truck-mounted escalator that can be used for safely and easily entering or exiting an aircraft, or other transport, when the entrance to the aircraft is located above ground level. In this regard, the present invention substantially fulfills this need. In this respect, the truck-mounted escalator according to the present invention substantially departs from the conventional concepts and designs of the prior art, and in doing so provides an apparatus primarily developed for the purpose of providing a mobile escalator which can easily be moved from place to place and quickly positioned for user access to the entrance of vehicles, such as airplanes, that are parked located significantly above ground level.

SUMMARY OF THE INVENTION

In view of the foregoing disadvantages inherent in the known types of portable escalators now present in the prior art, the present invention provides an improved truck-mounted escalator, and overcomes the above-mentioned disadvantages and drawbacks of the prior art. As such, the general purpose of the present invention, which will be described subsequently in greater detail, is to provide a new and improved truck-mounted escalator and method which has all the advantages of the prior art mentioned heretofore and many novel features that result in a truck-mounted escalator which is not anticipated, rendered obvious, suggested, or even implied by the prior art, either alone or in any combination thereof.

To attain this, the present invention essentially comprises an electric motor driven escalator unit with a handrail that is mounted via a hydraulic lift on a dump truck style truck body featuring a pair of control units located on the cab and the rear of the truck and with electrical power supplied by the truck battery.

There has thus been outlined, rather broadly, the more important features of the invention in order that the detailed description thereof that follows may be better understood and in order that the present contribution to the art may be better appreciated.

The escalator unit also features a fold-out bottom step and a bumper on the top with a matching bumper on the upper portion of the truck cab. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck-mounted escalator that has all of the advantages of the prior art portable escalators and none of the disadvantages.

It is another object of the present invention to provide a new and improved truck-mounted escalator that may be easily and efficiently manufactured and marketed.

An even further object of the present invention is to provide a new and improved truck-mounted escalator that has a low cost of manufacture with regard to both materials and labor, and which accordingly is then susceptible of low prices of sale to the consuming public, thereby making such a truck-mounted escalator economically available to the buying public.

Still another object of the present invention is to provide a new truck-mounted escalator that provides in the apparatuses and methods of the prior art some of the advantages thereof, while simultaneously overcoming some of the disadvantages normally associated therewith.

Even still another object of the present invention is to provide a truck-mounted escalator for providing mobile stairs upon which passengers may stand to move up from the ground to the door of an airplane or down towards the ground from the door of an airplane. This allows passengers, especially those suffering from physical limitations, to easily board aircraft from the ground or reach the ground from the aircraft without having to put forth the strenuous physical exertion required to climb or descend a steep flight of stairs.

Yet another object of the present invention is to provide a truck-mounted escalator that provides a lightweight escalator unit mounted on a truck body. This makes the escalator unit mobile and easy to position, increasing the ease of use and portability of the device.

Still yet another object of the present invention is to provide a truck-mounted escalator that provides an escalator unit formed as a single unit. This increases the safety and reliability of the device since it does not rely on collapsible supports which might not be lock into place correctly for each use.

Even yet another object of the present invention is to provide a truck-mounted escalator that is easily positioned with a hydraulic lift controlled by either of a pair of conveniently located control units. This allows the operator of the unit to easily and effortlessly control and position the escalator unit, saving time and physical exertion.

Lastly, it is an object of the present invention to provide a new and improved truck-mounted escalator that draws on the truck battery for the provision of electrical power. This provides a convenient and reliable energy source for the device, allowing it to be used wherever the truck can be driven.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
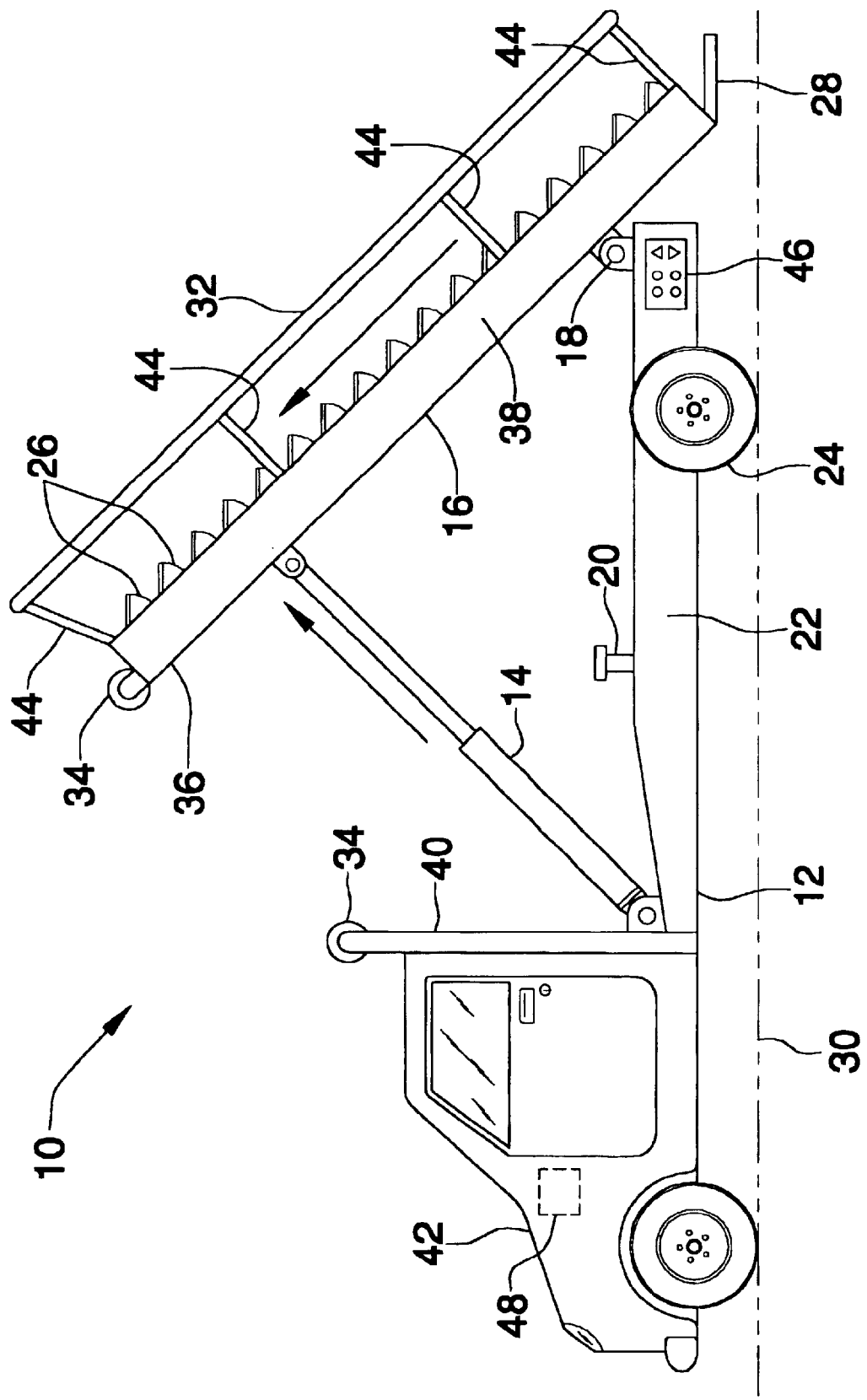
FIG. 1 is a left side view of the preferred embodiment of the truck-mounted escalator constructed in accordance with the principles of the present invention and with the escalator shown in the inclined position in which it would normally be employed.
Figure 2:
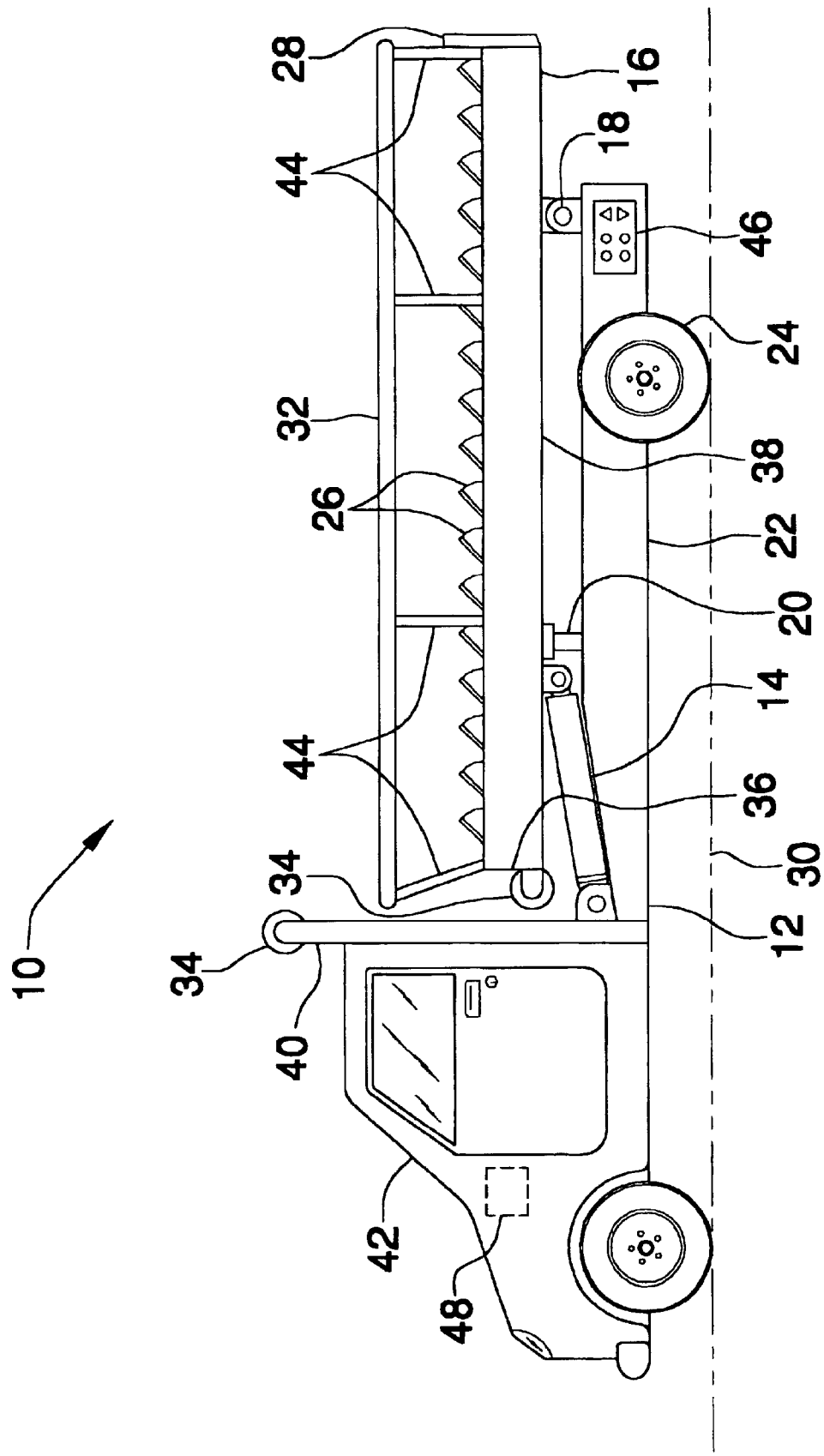
FIG. 2 is a left side view of the truck-mounted escalator of the present invention with the escalator shown in the horizontal position in which it would normally be stored when not in use.
Figure 3:
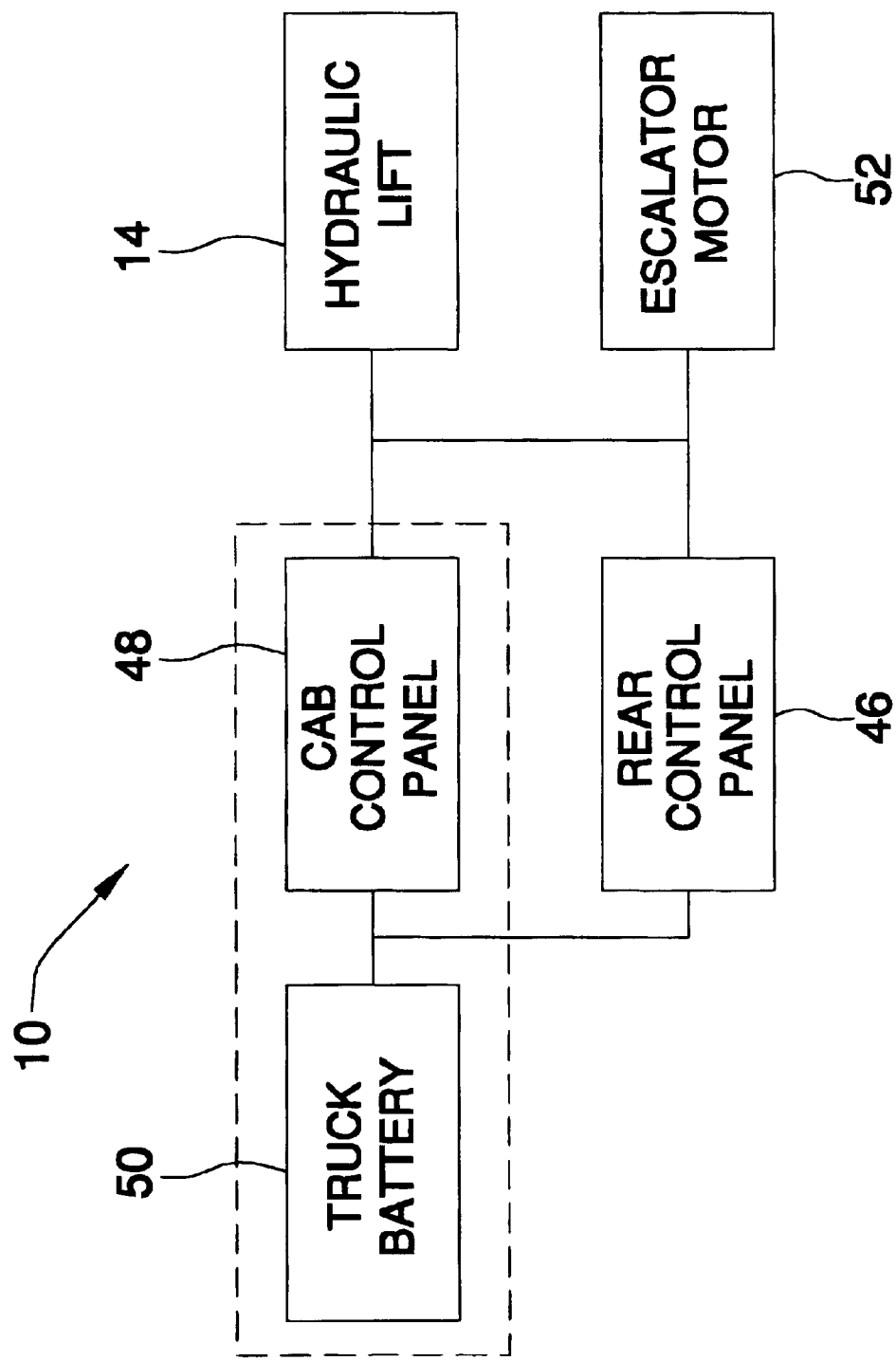
FIG. 3 is a functional block diagram of the truck-mounted escalator of the present invention.

Referring now to the drawings, and particularly to FIGS. 1–3, a preferred embodiment of the truck-mounted escalator of the present invention is shown and generally designated by the reference numeral 10.

In FIGS. 1 and 2, a new and improved truck-mounted escalator 10 of the present invention for providing a safe and easy to use portable escalator for entering or exiting access areas that are raised significantly above ground level is illustrated and will be described. More particularly, the truck-mounted escalator 10 is shown mounted on a dump truck body 12 having a hydraulic lift 14 which would be used to raise the escalator 16 into an inclined position. While the preferred embodiment presents the escalator mounted on a truck chassis, it could also be mounted on a dolly such as those frequently found at airports. The escalator 16, which is driven by an internal electric motor, would be removably mounted to the truck body 12 at the hydraulic lift 14 and at a rear pivot hinge 18. The truck body 12 would feature a support pad 20 in the center of the bed 22 for supporting the escalator 16 above the height of the wheels 24. The escalator 16 would feature motorized steps 26 typical of conventional escalators, a bottom fold-out step 28 for accessing the escalator 16 from the ground 30 or the ground 30 from the escalator 16, a hand rail 32 for support and to prevent passengers from falling, and a bumper 34 at the top end 36. The internal workings of the escalator 16 would be similar to those of a conventional escalator and would be enclosed in the base unit 38. A matching bumper 34 would be placed on the rear top 40 of the truck cab 42. The hand rail 32 shown has spaced supports 44, but it could be formed with a solid side wall for additional safety precautions. Controls of the escalator 16 and hydraulic lift 14 would be derived from a rear control panel 46 located on the truck bed 22 or from a cab control panel 48. These controls would allow the user to raise (see FIG. 1), lower (see FIG. 2), and adjust the angle of inclination of the escalator 16 as well as to activate the escalator 16.

FIG. 3 is a functional block diagram of the truck-mounted escalator 10. The truck battery 50 would be used to power the device. Either the cab control panel 48 or the rear control panel 46 could be used to operate both the hydraulic lift 14 and the escalator motor 52, which would be capable of moving the stairs in an upward or downward direction.

In use, it can now be understood that the truck-mounted escalator 10 would be driven to the desired location and easily positioned by maneuvering the vehicle with the steering wheel. The escalator operator would then raise the escalator 16 to the desired angle of inclination using either the rear control panel 46 or the cab control panel 48. Once the escalator 16 was properly positioned, the operator would proceed to activate the escalator motor 52 via one of the control panels, 46 or 48, which would subsequently start the movement of the escalator steps 26. The operator would choose the controls to have the steps 26 move in an upward direction if passengers were loading and in a downward direction if they were unloading. The operator might also adjust the bottom step 28, if necessary, for easier access to the ground 30 from the escalator 16. Passengers could then step onto the steps 26 and travel either to the ground 30, if unloading, or up to the airplane, if loading. Once the airplane was successfully loaded or unloaded, the motor 52 would be stopped, and the escalator 16 would be lowered by activation of the hydraulic lift 14 through one of the control panels, 46 or 48. The truck-mounted escalator 10 would then be driven to another airplane or to a desired storage location.

While a preferred embodiment of the truck-mounted escalator has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, aluminum, stainless steel, or heavy duty plastic may be used in manufacturing the parts of the present invention. And although providing a safe and portable means for assisting passengers when entering or exiting an aircraft has been described, it should be appreciated that the truck-mounted escalator herein described is also suitable for use with boats or other large vehicles as well as a rescue type device for low rise buildings.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A truck-mounted escalator comprising:
    a truck having conventional motor, battery, steering, electrical, rotary, and braking components and formed with a cab and a flat bed extending rearward from said cab;
    a hydraulic lift connected to said bed of said truck;
    a support pad connected to said bed of said truck;
    a pivot hinge connected to said bed of said truck;
    an escalator unit having a first end, a second end, a top, a bottom, and a plurality of steps, and connected on said bottom to said hydraulic lift and said pivot hinge;
    a cab control unit connected to said cab of said truck and electrically connected to said escalator unit; and
    a rear control unit connected to said bed of said truck and electrically connected to said escalator unit.

2. The truck-mounted escalator of claim 1 further comprising:
    a first bumper connected to said cab of said truck; and
    a second bumper connected to said first end of said escalator unit wherein said second bumper would come in contact with said first bumper when said escalator unit was lowered into a horizontal position on said bed of said truck.

3. The truck-mounted escalator of claim 1 wherein said hydraulic lift is mounted on said truck at the junction of said cab with said bed of said truck.

4. The truck-mounted escalator of claim 1 wherein said bed of said truck has a front end connected to said cab of said truck, a center, and a rear end and said pivot hinge is connected to said rear end of said bed of said truck.

5. The truck-mounted escalator of claim 4 wherein said support pad is located on said center of said bed of said truck and would support said bottom of said escalator unit when said escalator unit is placed in a horizontal position.

6. The truck-mounted escalator of claim 1 wherein said hydraulic lift, said cab control unit, and said rear control unit are wired to draw electrical power from said battery component of said truck.

7. The truck-mounted escalator of claim 1 wherein said escalator unit is formed similarly to a conventional escalator with an electrical motor driven assembly responsible for moving said steps.

8. The truck-mounted escalator of claim 7 wherein said electrical motor driven assembly is capable of moving said steps in a first direction and in a reverse direction from said first direction.

9. The truck-mounted escalator of claim 7 wherein said electrical motor driven assembly is wired to draw electrical power from said battery component of said truck.

10. The truck-mounted escalator of claim 1 wherein said escalator unit is formed with a handrail extending upwards from said bottom of said escalator unit.

11. The truck-mounted escalator of claim 1 wherein said cab control unit and said rear control unit are both electrically wired to control said escalator unit and said hydraulic lift wherein either said cab control unit or said rear control unit could be used to manipulate said hydraulic lift and said escalator unit.

12. A truck-mounted escalator comprising:
    a truck having conventional motor, battery, steering, electrical, rotary, and braking components and formed with a cab having a rear riser with a bumper and a flat bed extending rearward from said cab;
    a hydraulic lift connected to said bed of said truck;
    a support pad connected to said bed of said truck;
    a pivot hinge connected to said bed of said truck;
    an escalator unit containing and driven by an electrical motor assembly and having a first end, a second end, a top, a bottom, a plurality of steps, a bumper on said first end, and a flip down step on said second end, and connected on said bottom to said hydraulic lift and said pivot hinge;
    a cab control unit connected to said cab of said truck and electrically connected to said escalator unit; and
    a rear control unit connected to said bed of said truck and electrically connected to said escalator unit.

13. The truck-mounted escalator of claim 12 wherein said hydraulic lift is mounted on said truck at the junction of said cab with said bed of said truck.

14. The truck-mounted escalator of claim 12 wherein said bed of said truck has a front end connected to said cab of said truck, a center, and a rear end and said pivot hinge is connected to said rear end of said bed of said truck.

15. The truck-mounted escalator of claim 14 wherein said support pad is located on said center of said bed of said truck and would support said bottom of said escalator unit when said escalator unit is placed in a horizontal position.

16. The truck-mounted escalator of claim 12 wherein said hydraulic lift, said cab control unit, and said rear control unit are wired to draw electrical power from said battery component of said truck.

17. The truck-mounted escalator of claim 12 wherein said electrical motor assembly is capable of moving said steps in a first direction and in a reverse direction from said first direction.

18. The truck-mounted escalator of claim 12 wherein said electrical motor assembly is wired to draw electrical power from said battery component of said truck.

19. The truck-mounted escalator of claim 12 wherein said escalator unit is formed with a handrail extending upwards from said bottom of said escalator unit.

20. The truck-mounted escalator of claim 12 wherein said cab control unit and said rear control unit are both electrically wired to control said escalator unit and said hydraulic lift wherein either said cab control unit or said rear control unit could be used to manipulate said hydraulic lift and said escalator unit.

* * * * *